(12) United States Patent  
Inagaki

(10) Patent No.: US 12,182,711 B2  
(45) Date of Patent: *Dec. 31, 2024

(54) GENERATION OF NEURAL NETWORK CONTAINING MIDDLE LAYER BACKGROUND

(71) Applicant: International Business Machines Corporation, Armonk, NY (US)

(72) Inventor: Takeshi Inagaki, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 989 days.

This patent is subject to a terminal disclaimer.

(21) Appl. No.: 16/440,064

(22) Filed: Jun. 13, 2019

(65) Prior Publication Data

US 2019/0294969 A1  Sep. 26, 2019

Related U.S. Application Data

(63) Continuation of application No. 15/875,575, filed on Jan. 19, 2018, now Pat. No. 12,020,160.

(51) Int. Cl.
*G06N 3/082* (2023.01)
*G06F 18/214* (2023.01)
(Continued)

(52) U.S. Cl.
CPC ........... *G06N 3/082* (2013.01); *G06F 18/214* (2023.01); *G06F 18/24133* (2023.01);
(Continued)

(58) Field of Classification Search
CPC ...... G06N 3/082; G06N 3/0454; G06N 3/088; G06K 9/6256; G06K 9/6271
See application file for complete search history.

(56) References Cited

U.S. PATENT DOCUMENTS 7,996,440 B2   8/2011   Probst et al.
8,583,419 B2  11/2013   Yasin
(Continued)

FOREIGN PATENT DOCUMENTS

JP    H05101209 A    4/1993
JP    2012018450 A   1/2012
JP    2017151438 A   8/2017

OTHER PUBLICATIONS

Wang, Z., He, Y., & Jiang, M. (Nov. 2006). A comparison among three neural networks for text classification. In 2006 8th international Conference on Signal Processing (vol. 3). IEEE. (Year: 2006) (Year: 2006).*

(Continued)

*Primary Examiner* — Kamran Afshar
*Assistant Examiner* — Lokesha G Patel
(74) *Attorney, Agent, or Firm* — Shackelford, McKinley & Norton, LLP; Robert A. Voigt, Jr.

(57) ABSTRACT

A method, computer program product and system for generating a neural network. Initial neural networks are prepared, each of which includes an input layer containing one or more input nodes, a middle layer containing one or more middle nodes, and an output layer containing one or more output nodes. A new neural network is generated that includes a new middle layer containing one or more middle nodes based on the middle nodes of the middle layers of the initial neural networks.

7 Claims, 11 Drawing Sheets

(51) Int. Cl.
  *G06F 18/2413* (2023.01)
  *G06N 3/045* (2023.01)
  *G06N 3/088* (2023.01)
  *G06V 10/82* (2022.01)

(52) U.S. Cl.
  CPC ............. *G06N 3/045* (2023.01); *G06N 3/088* (2013.01); *G06V 10/82* (2022.01)

(56) References Cited

U.S. PATENT DOCUMENTS

| | | | |
|---|---|---|---|
| 9,235,812 B2 | 1/2016 | Scholtes | |
| 9,575,952 B2 | 2/2017 | Kumar Rangarajan Sridhar | |
| 9,646,262 B2 | 5/2017 | Phillipps et al. | |
| 9,659,560 B2* | 5/2017 | Cao | G06N 3/04 |
| 2007/0011114 A1 | 1/2007 | Chen et al. | |
| 2016/0093050 A1* | 3/2016 | Kim | G06T 7/32 382/128 |
| 2016/0328388 A1 | 11/2016 | Cao et al. | |

OTHER PUBLICATIONS

Schwenker, F., Kestler, H. A., & Palm, G. (2001). Three learning phases for radial-basis-function networks. Neural networks, 14(4-5), 439-458. (Year: 2001).*

Suganuma, M., Shirakawa, S., & Nagao, T. (Jul. 2017). A genetic programming approach to designing convolutional neural network architectures. In Proceedings of the genetic and evolutionary computation conference (pp. 497-504). (Year: 2017).*

Office Action for U.S. Appl. No. 15/875,575 dated Sep. 23, 2021, pp. 1-96.

Suganuma et al., "A Genetic Programming Approach to Designing Convolutional Neural Network Architectures," Proceedings of the Genetic and Evolutionary Computation Conference, Jul. 2017, pp. 497-504.

Wang et al., "A Comparison Among Three Neural Networks for Text Classification," 8th International Conference on Signal Processing, Guilin, China, Nov. 16-20, 2006, pp. 1-4.

Ko et al., "Automatic Text Categorization by Unsupervised Learning," http://aclweb.org/anthology/C00-1066, Mar. 5, 2013, pp. 1-7.

Darena et al., "Grouping of Customer Opinions Written in Natural Language Using Unsupervised Machine Learning," 14th International Symposium on Symbolic and Numeric Algorithms for Scientific Computing, Timisoara, Romania, Sep. 26-29, 2012, pp. 265-270, See Abstract provided.

Dai et al., "From Social Media to Public Health Surveillance: Word Embedding Based Clustering Method for Twitter Classification," SoutheastCon, Charlotte, NC, USA, Mar. 30-Apr. 2, 2017, pp. 1-7, See Abstract provided.

Hinton et al., "A Fast Learning Algorithm for Deep Belief Nets," Neural Computation, vol. 18, pp. 1527-1554.

Lawrence McAfee, "Document Classification Using Deep Belief Nets," Jun. 4, 2008, pp. 1-15.

Vincent et al., "Extracting and Composing Robust Features with Denoising Autoencoders," Proceedings of the Twenty-fifth International Conference on Machine Learning (ICML'08), 2008, pp. 1096-1103.

Chen et al., "KATE: K-Competitive Autoencoder for Text," KDD'17, Halifax, NS, Canada, Aug. 13-17, 2017, pp. 85-94.

Liao et al., "How Important is Weight Symmetry in Backpropagation?" Proceedings of the Thirtieth AAAI Conference on Artificial Intelligence (AAAI-16), 2016, pp. 1837-1844.

List of IBM Patents or Patent Applications Treated as Related, Jun. 17, 2019, pp. 1-2.

Office Action for U.S. Appl. No. 15/875,575 dated Apr. 19, 2022, pp. 1-113.

Office Action for U.S. Appl. No. 15/875,575 dated Aug. 4, 2022, pp. 1-40.

Suganuma et al., "A Genetic Programming Approach to Designing Convolutional Neural Network Architectures," arXiv: 1704.00764v2, Aug. 11, 2017, pp. 1-9.

Jian-Feng Zhai, "Application of Deep Learning in NLP," 2013, pp. 1-3, See Abstract.

Office Action for Chinese Application No. 201910018572.5 dated Jun. 5, 2023, pp. 1-10.

Office Action for U.S. Appl. No. 15/875,575 dated Feb. 8, 2023, pp. 1-58.

Office Action for Chinese Patent Application No. 201910018572.5 issued by China National Intellectual Property Administration on Aug. 22, 2023, pp. 1-9.

Office Action for Chinese Application No. 201910018572.5 dated Dec. 22, 2023, pp. 1-7.

* cited by examiner

GENERATION OF NEURAL NETWORK CONTAINING MIDDLE LAYER

BACKGROUND

Technical Field

The present invention relates generally to supervised learning methods, and more particularly to the generation of a neural network containing a middle layer.

Background

Popular supervised learning methods such as Naïve Bayes and Support Vector Machine have been used for classification of text documents. These methods may often fail to properly classify words that do not appear in training documents because vocabulary recognized by classifiers created from these methods is limited to words in the training documents.

On the other hand, a neural network such as Convolutional Neural Network may work well for image recognition. However, prior attempts to simply apply a convolutional neural network to Natural Language Processing have not been successful, which is likely because documents are not physical phenomenon in continuous physical space, contrary to images, and do not form continuous geometry. In order to achieve satisfactory performance in text classification, neural networks may need a large number of layers/nodes, which may require enormous computational resources.

SUMMARY

In one embodiment of the present invention, a method for generating a neural network comprises preparing, by a processor, a plurality of initial neural networks, each of which comprises an input layer containing one or more input nodes, a middle layer containing one or more middle nodes, and an output layer containing one or more output nodes. The method further comprises generating, by the processor, a new neural network comprising a new middle layer containing one or more middle nodes based on the middle nodes of the middle layers of the plurality of initial neural networks.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
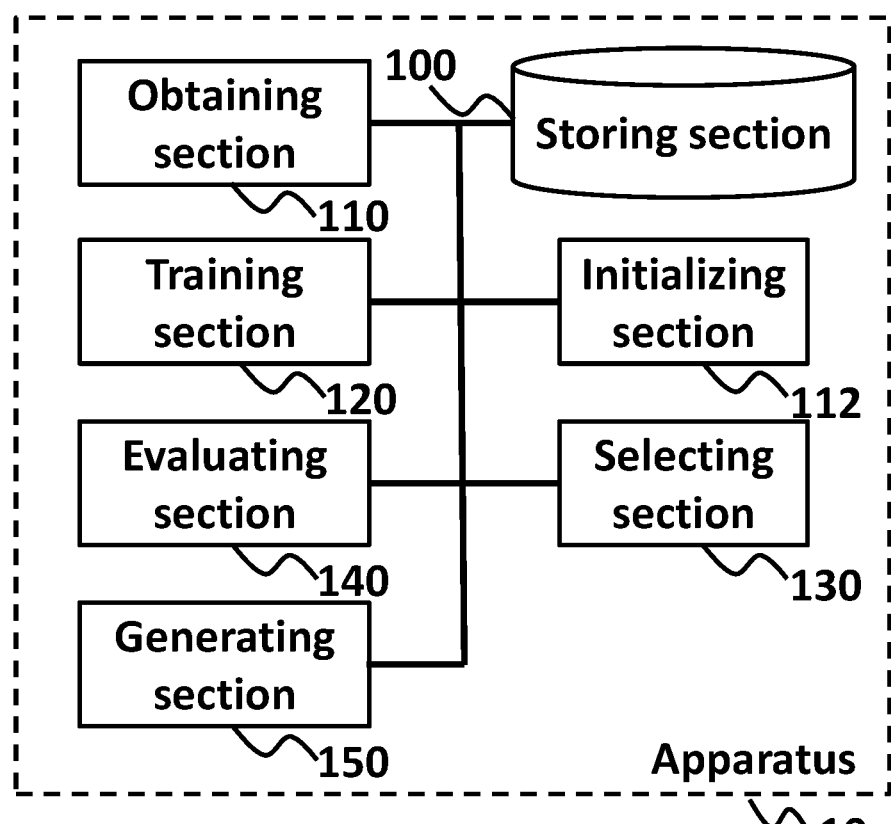
FIG. 1 shows an exemplary configuration of an apparatus 10, according to an embodiment of the present invention.

FIG. 1 shows an exemplary configuration of an apparatus 10, according to an embodiment of the present invention. The apparatus 10 may generate a neural network that can classify objects such as texts, such as words, characters, symbols, and strings thereof. In an embodiment, the apparatus 10 may first prepare a plurality of initial neural networks, and then generate a new neural network from the plurality of initial neural networks.

The apparatus 10 may include a processor and/or programmable circuitry. The apparatus 10 may further include one or more computer readable mediums collectively including instructions. The instructions may be embodied on the computer readable medium and/or the programmable circuitry. The instructions, when executed by the processor or the programmable circuitry, may cause the processor or the programmable circuitry to operate as a plurality of operating sections.

Thereby, the apparatus 10 may be regarded as including a storing section 100, an obtaining section 110, an initializing section 112, a training section 120, a selecting section 130, an evaluating section 140, and a generating section 150.

The storing section 100 may store information used for the processing that the apparatus 10 performs. The storing section 100 may also store a variety of data/instructions used for operations of the apparatus 10. One or more other elements in the apparatus 10 (e.g., the obtaining section 110, the initializing section 112, the training section 120, the selecting section 130, the evaluating section 140, and the generating section 150) may communicate data directly or via the storing section 100, as necessary.

The storing section 100 may be implemented by a volatile or non-volatile memory of the apparatus 10. In some embodiments, the storing section 100 may store neural networks, parameters, and other data related thereto.

The obtaining section 110 may obtain a plurality of initial conditions. The obtaining section 110 may also obtain training data. The obtaining section 110 may obtain other data necessary for operations of the apparatus 10.

The initializing section 112 may initialize an input layer of a neural network. The input layer may contain one or more input nodes. In an embodiment, the input layer may contain a plurality of input nodes. In an embodiment, the input layer may be a word layer containing a plurality of word nodes.

The training section 120 may prepare a plurality of candidate neural networks using at least the plurality of initial conditions obtained by the obtaining section 110. Each of the plurality of candidate neural networks may include the input layer that the initializing layer 112 initialized, a middle layer containing one or more middle nodes, and an output layer containing one or more output nodes.

In an embodiment, the middle layer may contain a plurality of middle nodes and the output layer may contain a plurality of output nodes. The training section 120 may perform unsupervised training on the middle layer and supervised training on the output layer. In an embodiment, the middle layer may be a concept layer containing a plurality of concept nodes and the output layer may be a category layer containing a plurality of category nodes.

The selecting section 130 may evaluate a performance of each of the candidate neural networks prepared by the training section 120. The selecting section 130 may further select neural networks, as initial neural networks, from among the candidate neural networks prepared by the training section 120 using the performance evaluations of the candidate neural networks.

The evaluating section 140 may evaluate the middle nodes of the initial neural networks and select one or more of the middle nodes of the initial neural networks based on the evaluation.

The generating section 150 may generate a new neural network from the initial neural networks. In an embodiment, the new neural network may include an input layer containing one or more input nodes, a new middle layer containing one or more middle nodes, and a new output layer containing one or more output nodes.

In an embodiment, the new middle layer may be based on the middle nodes of the middle layers of the plurality of initial neural networks selected by the evaluating section 140. The new neural network may have input nodes identical to the plurality of initial neural networks prepared by the training section 120.

Figure 2:
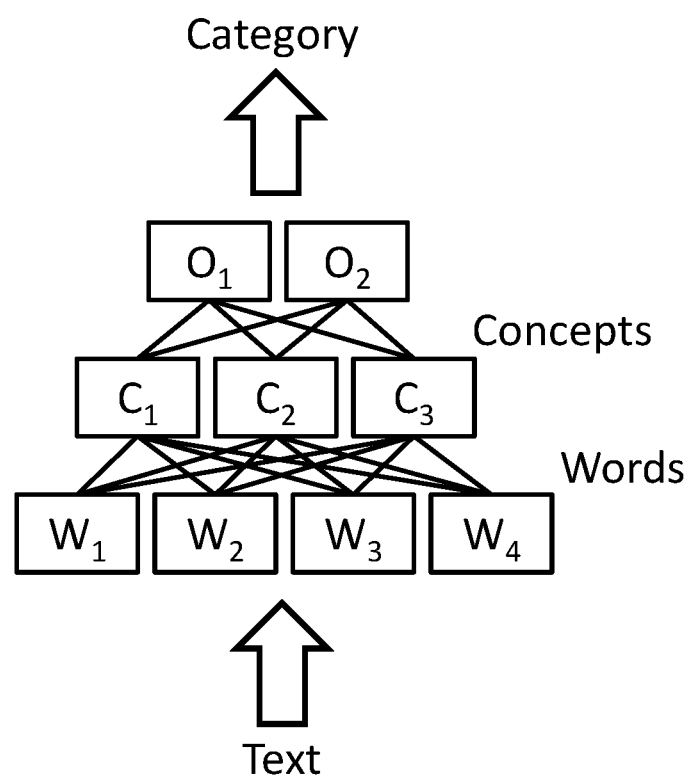
FIG. 2 shows an exemplary a neural network, according to an embodiment of the present invention.

FIG. 2 shows an exemplary neural network, according to an embodiment of the present invention. Candidate neural networks, initial neural networks, and new neural networks may have substantially similar structure and function to the neural network shown in FIG. 2.

In an embodiment, the input layer is a word layer, and the input nodes are word nodes shown as $W_1$-$W_4$ in FIG. 2. Each of the word nodes may represent a word or a group of words. In the embodiment, when the word layer receives a word, each word node corresponding to the word will fire. For example, each word node inputs individual characters in a word, and a word node that outputs the largest value can be regarded as corresponding to the word. For example, when the input layer inputs a word "apple", a word node representing the word "apple" in the input layer may output a large value.

In an embodiment, the middle layer is a concept layer, and the middle nodes are concept nodes shown as $C_1$-$C_3$ in FIG. 2. Each concept node may represent a concept of the text. In the embodiment, when the concept layer receives word information from the word layer, each concept node corresponding to a concept of the word information fires. For example, when the concept layer inputs the outputs from the input layer representing a word "apple", a middle node representing a concept "fruit" in the middle layer may output a large value.

In an embodiment, the output layer is a category layer, and the output nodes are category nodes shown as $W_1$-$W_2$ in FIG. 2. Each output node may represent a category of the text. In the embodiment, when the output layer receives concept information from the concept layer, each category node (or nodes) corresponding to a category of the concept information fires. For example, when the output layer inputs the outputs from the middle layer representing a concept "fruit", an output node representing a category "food" in the output layer may output a large value.

As such, input of the neural network shown in FIG. 2 may be a text (e.g., a sequence of words) and output of neural network may be categories of the text (e.g., a sequence of categories).

Figure 3:
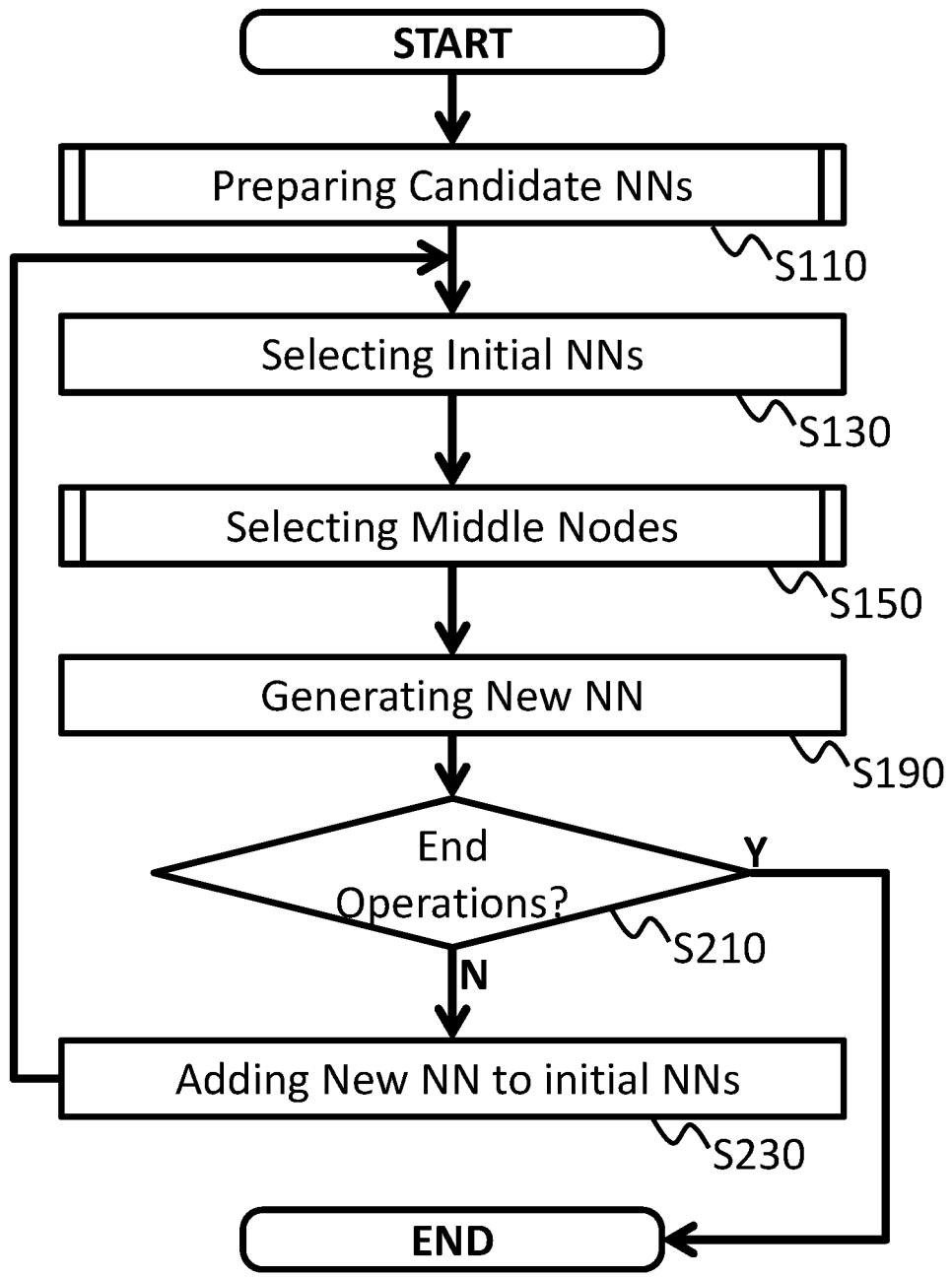
FIG. 3 shows an operational flow according to an embodiment of the present invention.

FIG. 3 shows an operational flow according to an embodiment of the present invention. The present embodiment describes an example in which an apparatus, such as the apparatus 10, performs operations from S110 to S230, as shown in FIG. 3 to generate a new neural network.

At S110, the apparatus may prepare a plurality of candidate neural networks. In an embodiment, the apparatus may prepare M candidate neural networks, where M is an integer larger than 1.

Figure 4:
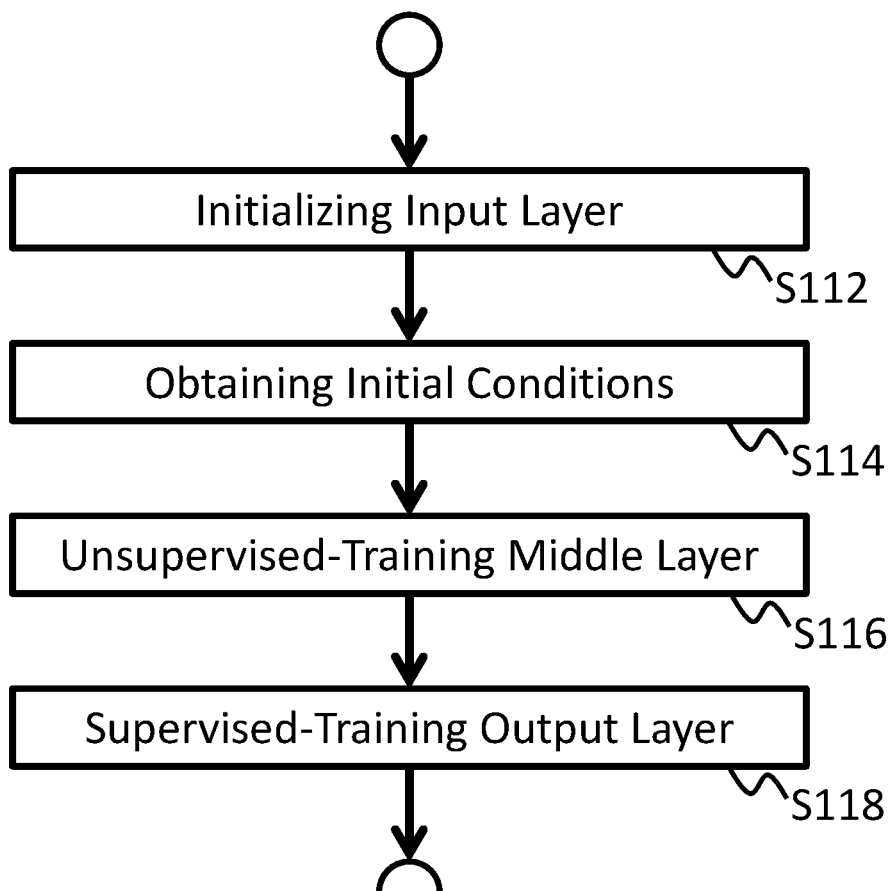
FIG. 4 shows a sub-flow of S110 according to an embodiment of the present invention.

FIG. 4 shows a sub-flow of S110 according to an embodiment of the present invention. Referring to FIG. 4, the apparatus may perform operations from S112 to S118 at S110 in FIG. 3.

At S112, an initializing section such as the initializing section 112 may initialize an input layer. The initializing section may initialize the input layer such as the word layer using a known method.

In an embodiment, the initializing section may perform mapping of words to input nodes. In the embodiment, the initializing section may perform the mapping by creating a list of words tokenized from a text corpus, assigning sequential number to the words in the list and associating each of the words to each of the input nodes. In an embodiment, the input layer may contain 10000 nodes, each corresponding to a word or a group of words.

At S114, an obtaining section such as the obtaining section 110 may obtain a plurality of initial conditions. In an embodiment, the obtaining section may obtain M initial conditions. In an embodiment, each of the M initial conditions may be used for preparing each one of M candidate neural networks and may contain a set of initial parameters. In an embodiment, each initial condition may include a pair of initial parameters for supervised training and initial parameters for unsupervised training.

In an embodiment, the obtaining section may create random parameters as each of the initial conditions. In another embodiment, the obtaining section may receive the parameters from a user of the apparatus as the initial conditions. In an embodiment, M initial conditions may partially or totally differ from each other.

The obtaining section may further obtain original training data. The original training data may include a plurality of pairs of an input object and an output target. In an embodiment, the original training data may include a plurality of pairs of a text and a category of the text.

At S116, a training section such as the training section 120 may perform unsupervised training of the middle layer of each candidate neural network using the corresponding initial condition.

The training section may perform the unsupervised training based on any type of Restricted Boltzmann Machine training. In an embodiment, the training section may utilize an AutoEncoder algorithm (e.g., Denoising AutoEncoders) for performing the unsupervised training. The model in the algorithm is represented by an action S(x, y) shown in formula (1), and probability is an exponent of the action S(x, y) as shown in formula (2).

$$S(x,y) = -(\Sigma_{i,j} w_{i,j} y_i x_j + \Sigma_i b_i y_i + \Sigma_j c_j x_j) \quad (1)$$

$$P(x,y) = e^{-S(x,y)} \quad (2)$$

where $y_i$ represents an output from an i-th middle node, $x_j$ represents an output from a j-th input node, and $w_{i,j}$ represents a weight between the i-th middle node and the j-th input node.

In an embodiment, the training section may perform autoencoding and decoding steps by minimizing cross entropy loss function L, as shown in formula (3). In the embodiment, the training section may minimize L by adjusting parameters $w_{i,j}$, $b_i$ and $c_j$ by stochastic gradient descent.

$$L = \Sigma_j \{x_j \ln \hat{x}_j + (1-x_j)\ln(1-\hat{x}_j)\} \quad (3),$$

where $\hat{x}_j$ is a reconstructed visible parameter calculated from formulae (4)-(7)

$$\hat{x}_j = \frac{1}{1 + e^{-E_j}} \quad (4)$$

$$\hat{y}_j = \frac{1}{1 + e^{-E_i}} \quad (5)$$

$$E_i = \sum_j w_{i,j} x_j + b_i \quad (6)$$

$$E_j = \sum_j w_{i,j} \hat{y}_i + c_j \quad (7)$$

The training section may perform the unsupervised training of the middle layers of M candidate neural networks. In an embodiment, the training section may use each of the initial parameters for unsupervised training in M initial conditions as initial w, b, and c in each of M candidate neural networks. In an embodiment, the number of middle nodes in each middle layer may be smaller than the number of input nodes. For example, the number of the middle nodes may be 40.

Figure 5:
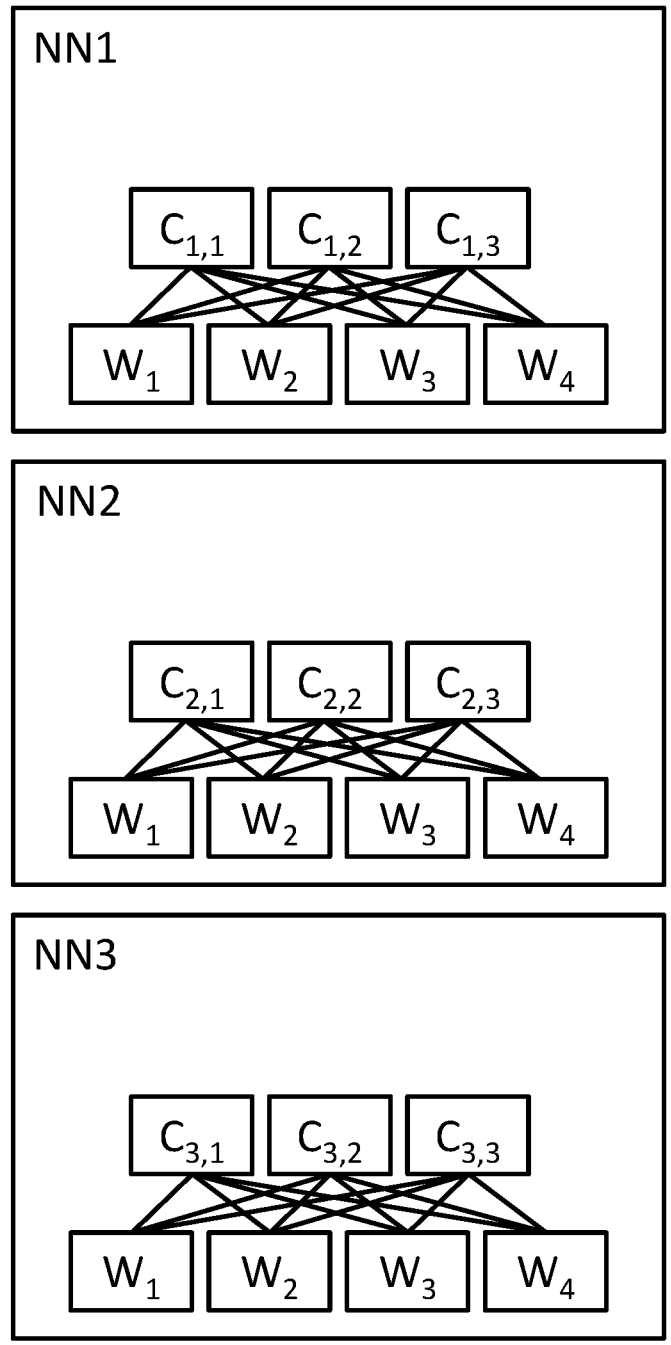
FIG. 5 shows unsupervised training of the middle layer according to an embodiment of the present invention.

FIG. 5 shows unsupervised training of the middle layer according to an embodiment of the present invention. The training section may build a middle layer on the input layer initialized at S112.

In the embodiment of FIG. 5, the number of candidate neural network M is 3, and the candidate neural networks may include Neural Network 1 (which may be referred to as NN1), Neural Network 2 (which may be referred to as NN2), and Neural Network 3 (which may be referred to as NN3). The training section performs unsupervised training of the middle layers for NN1, NN2, and NN3.

NN1, NN2, and NN3 have the same input nodes $W_1$-$W_4$ in the input layer in common, but have different middle nodes in the middle layer due to differences in the M initial conditions. In the embodiment of FIG. 5, NN1 contains middle nodes $C_{1,1}$-$C_{1,3}$, NN2 contains middle nodes $C_{2,1}$-$C_{2,3}$, and NN3 contains middle nodes $C_{3,1}$-$C_{3,3}$, in the middle layer.

At S118, the training section may perform supervised training of the output layer of each candidate neural network using a set of training data. In an embodiment, the training section may use all or a part of the original training data as the set of training data. In an embodiment, the training section may use the same or different training sets for training of the output layer for the candidate neural networks.

In an embodiment, the training section may use each of the initial parameters for supervised training in M initial conditions. In an embodiment, the training section may or may not update the middle nodes in the middle layer during the supervised training of the output layer.

In an embodiment, the training section may perform the supervised training by any method known in the art of neural networks. Thereby, the training section may prepare the plurality of candidate neural networks (e.g., M candidate neural networks).

Figure 6:
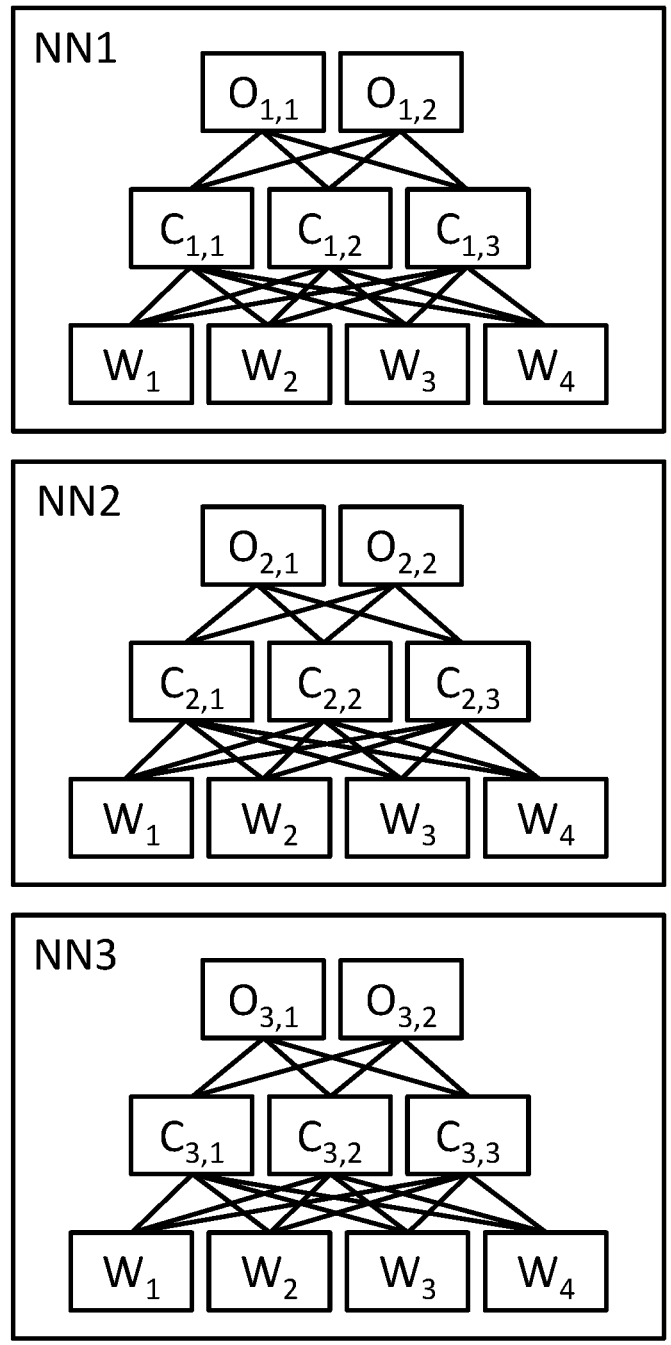
FIG. 6 shows M initial neural networks according to an embodiment of the present invention.

FIG. 6 shows M initial neural networks according to an embodiment of the present invention. The training section may build an output layer on the middle layer trained at S116.

The training section performs supervised training of the output layers for NN1, NN2, and NN3. NN1, NN2, and NN3 have different output nodes due to differences in their middle layers. In the embodiment of FIG. 6, Neural Network 1 contains output nodes $O_{1,1}$-$O_{1,2}$, Neural Network 2 contains output nodes $O_{2,1}$-$O_{2,2}$, and Neural Network 3 contains output nodes $O_{3,1}$-$O_{3,2}$, in the output layer.

At S130, a selecting section such as the selecting section 130 may select initial neural networks from among the candidate neural networks.

In an embodiment, the selecting section may first evaluate a performance of each of M candidate neural networks. For example, the selecting section may input at least some of the original training data into each of M candidate neural networks, and calculate classification accuracy of each candidate neural network as the performance. Then, the selecting section may select N neural networks, as the initial neural networks, from among the M candidate neural networks using the performances. N being an integer larger than 1 and smaller than M.

Figure 7:
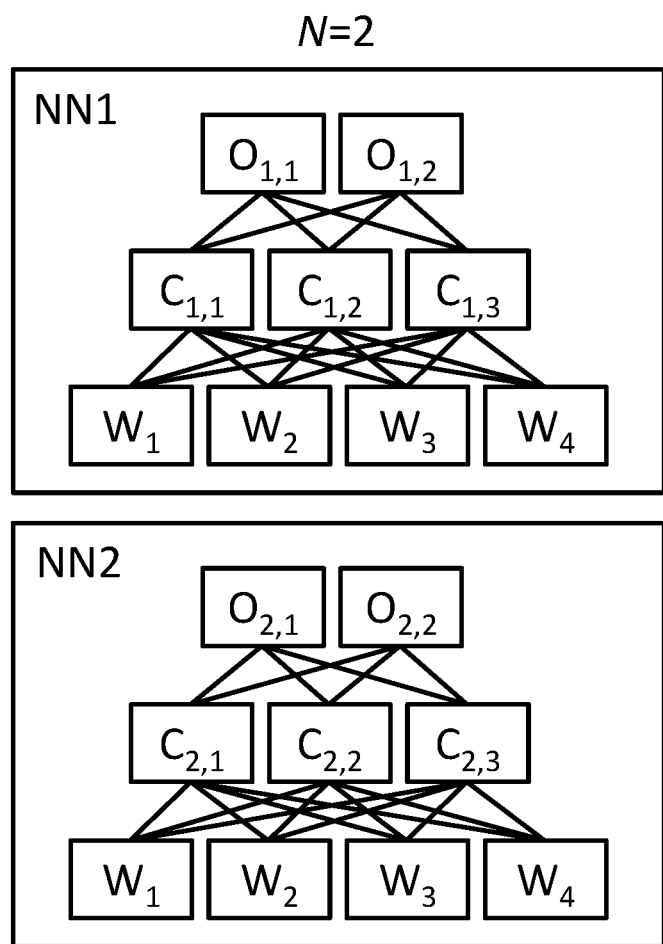
FIG. 7 shows N initial neural networks according to an embodiment of the present invention.

FIG. 7 shows N initial neural networks according to an embodiment of the present invention. In an embodiment of FIG. 2, N is 2 and the selecting section may select NN1 and NN2 as the initial neural networks among three candidate neural networks shown in FIG. 6.

At S150, the apparatus may select one or more of the middle nodes of the initial neural networks. In an embodiment, the apparatus may select a plurality of middle nodes of N initial neural networks.

Figure 8:
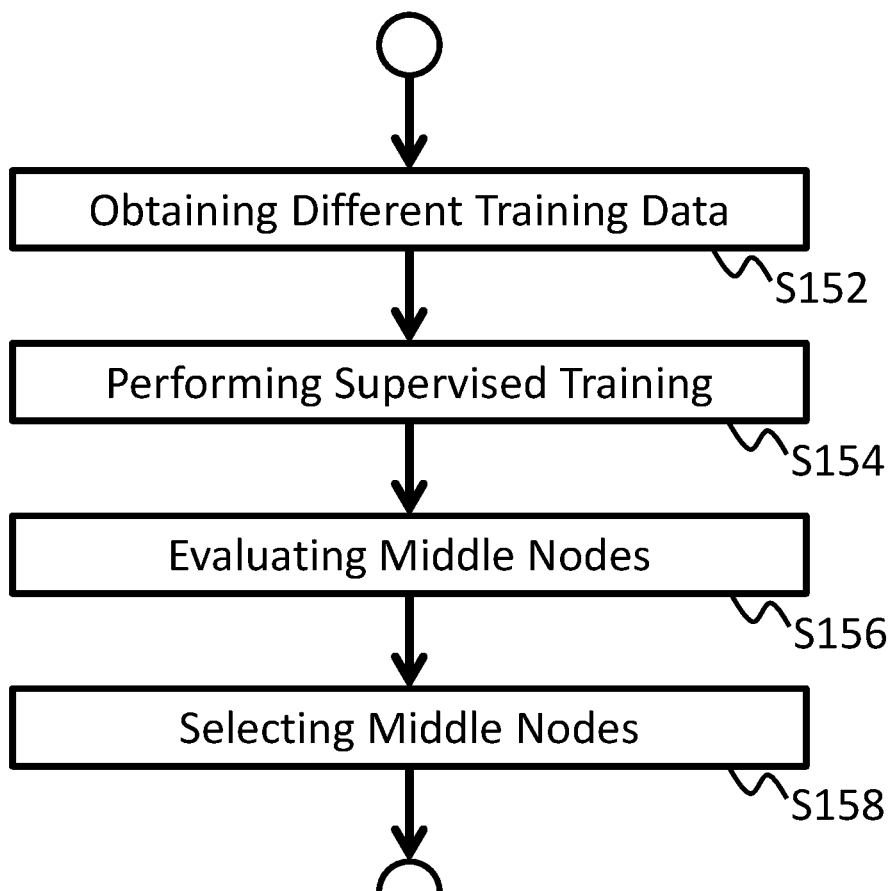
FIG. 8 shows a sub-flow of S150 according to an embodiment of the present invention.

FIG. 8 shows a sub-flow of S150 according to an embodiment of the present invention. Referring to FIG. 8, the apparatus may perform the operations from S152 to S158 at S150 in FIG. 3.

At S152, the obtaining section may prepare different sets of training data from the original training data. In an embodiment, the obtaining section may divide the original training data into K sets and obtain the K sets as K different sets of training data. K may be an integer more than 1, and for example 2.

At S154, the training section may perform supervised training of the initial neural networks with the different sets of training data obtained at S152. In an embodiment, the training section may perform supervised training on the output layers of the N initial neural networks with each of the K different sets of training data to obtain K training results for each of the N initial neural networks. By the supervised training at S154, the training section may generate K×N training results.

In an embodiment, the training section may or may not update the middle nodes in the middle layer during the supervised training of the output layer. The training section may perform the supervised training by any method known in the art of neural networks.

Figure 9:
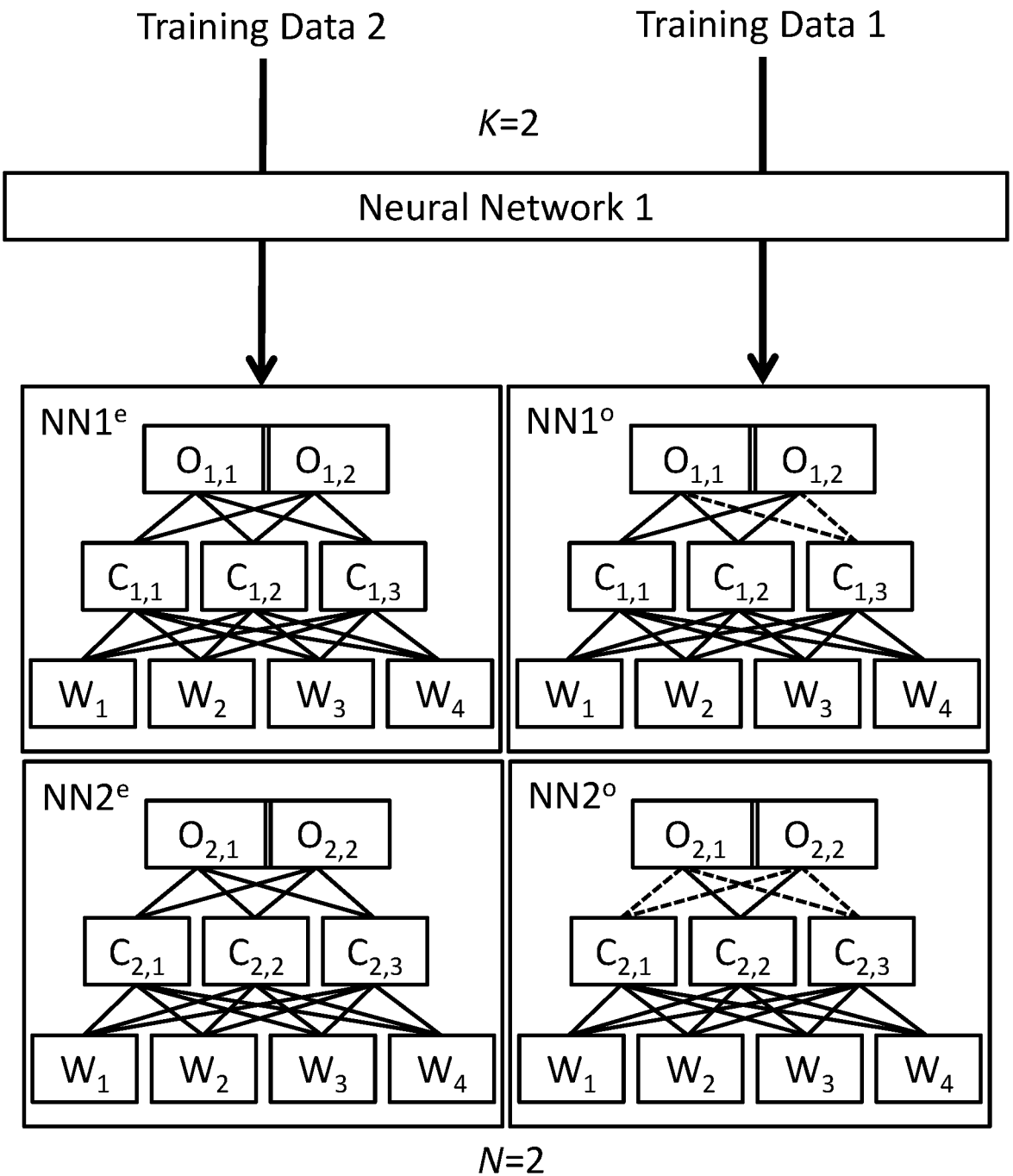
FIG. 9 shows K training results for N initial neural networks according to an embodiment of the present invention.

FIG. 9 shows K training results for N initial neural networks according to an embodiment of the present invention. In the embodiment of FIG. 9, N is 2 and K is 2. In the embodiment, the obtaining section may evenly divide the original training data into two sets, one may be identified as "odd training data set" and the other as "even training data set."

The training section may perform the supervised training on NN1 with the even training data set to obtain NN1$^e$, and perform the supervised training on NN1 with the odd training data set to obtain NN1$^o$ as shown in FIG. 9. The training section may also perform the supervised training on NN2 with the odd training data set to obtain NN2$^o$, and perform the supervised training on NN2 with the even training data set to obtain NN2$^e$. The even/odd training data set used for NN1 may or may not be the same as the one used for NN2.

At S156, an evaluating section such as the evaluating section 140 may evaluate the middle nodes of each of the initial neural networks using at least the results of the supervised training at S154. In an embodiment, the evaluating section may evaluate the contribution of each of the middle nodes to an output of the output layer.

In a specific embodiment, the evaluating section may calculate a coincidence score of each of the middle nodes in each of the initial neural networks, as the contribution of each middle node. The coincidence score may represent the similarity of a connection to the output layer between corresponding middle nodes in the training results at S154. For example, if weights between one middle node to output nodes in a training result are similar to weights between the one middle node to the output nodes in the other training result in one initial neural network, the one middle node is considered to be stable against a difference of training data and to be important among the middle nodes in the middle layer.

In an embodiment, the coincidence score $s_{n,i}$, of the i-th middle node in an n-th initial neural network is represented by a following formula (8).

$$s_{n,i} = \Sigma_{k \neq k'} \Sigma_o w_{o,i}^{n,k} w_{o,i}^{n,k'} \quad (8)$$

where $w^{n,k}_{o,i}$ represents a weight between the i-th middle node and the o-th output node in the k-th training result of the n-th initial neural network.

In an embodiment, the evaluating section may calculate the coincidence score $s_{n,i}$ for each middle node of the N initial neural networks. In the embodiment of FIG. 9, when defining a weight between an i-th middle node and an o-th output node in the t-th Neural Network as $w^t_{i,o}$, the evaluating section may calculate the coincidence score $s_{1,1}$ by using weights $w^{le}_{1,1}$, $w^{le}_{1,2}$, $w^{lo}_{1,1}$, and $w^{lo}_{1,2}$. The evaluating section may also calculate the coincidence score $s_{1,2}$ and $s_{1,3}$ of NN1 and $s_{2,1}$, $s_{2,2}$ and $s_{2,3}$ of NN2.

At S158, the evaluating section may select one or more of the middle nodes of each of the plurality of initial neural networks using at least the evaluation made at S156. In an embodiment, the evaluating section may select at least one of the middle nodes in the middle layer of the N initial neural networks using the K training results, such that selected middle nodes contribute to an output from the output layer to a greater degree than non-selected middle nodes.

For example, when each initial neural network has L (which is an integer larger than 2) middle nodes in the middle layer, a number of the middle nodes that the evaluating section selects, is equal to or less than L. In the example, the evaluating section selects L' (which is equal to or smaller than L but larger than 2) middle nodes from among N×L middle nodes of the N initial neural networks.

Figure 10:
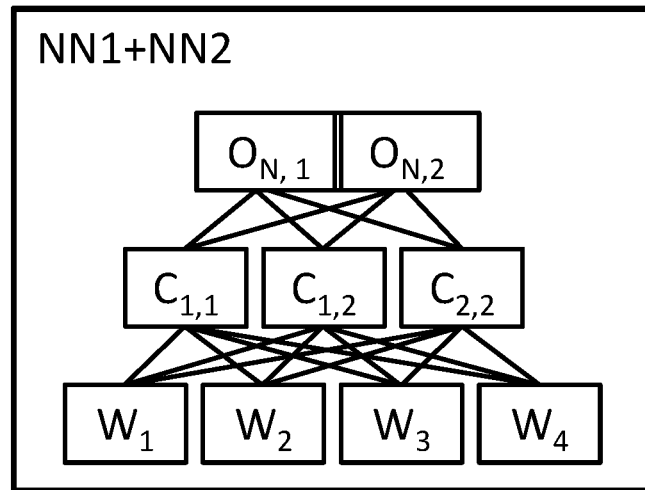
FIG. 10 shows the new neural network according to an embodiment of the present invention.

In an embodiment, the evaluating section may select middle nodes that have larger coincidence scores $s_{n,i}$ than other middle nodes. In the embodiment of FIG. 10, in response to determining that coincidence scores $s_{1,1}$, $s_{i,2}$, $s_{2,2}$ are larger than coincidence scores $s_{1,3}$, $s_{2,1}$, $s_{2,3}$, the evaluating section may select the middle node $C_{1,1}$, $C_{1,2}$ in NN1 and $C_{2,2}$ in NN2.

At S190, a generating section such as the generating section 150 may generate a new neural network using at least the middle layers of the initial neural networks.

In an embodiment, the generating section may perform supervised training of an output layer on top of a middle layer containing the middle nodes selected at S150 for a new neural network. In an embodiment, the generating section may cause the training section to perform supervised training on an output layer of a neural network containing an input layer that is the same as the input layer of the initial neural networks and a middle layer containing the middle nodes selected at S150.

In an embodiment, the generating section may use at least part of the output nodes in the initial neural networks (e.g., NN1, NN2) as initial parameters of this supervised training. In an embodiment, the generating section may generate random parameters and use them as the initial parameters of this supervised training.

Thereby the generating section may obtain the new neural network containing an input layer that is the same as the input layer of the initial neural networks, the middle layer containing the middle nodes selected at S150, and a new output layer containing new output nodes.

FIG. 10 shows the new neural network according to an embodiment of the present invention. In the embodiment of FIG. 10, the new neural network is made from NN1 and NN2. The new neural network contains $W_1$-$W_4$ which are the same as those in NN1 and NN2 in the input layer, $C_{1,1}$, $C_{12}$, $C_{22}$ that are selected at S150 in a new middle layer, and new output nodes $O_{N,1}$-$O_{N,2}$ trained at S190 in a new output layer.

In the embodiments above, the new middle layer in the new neural network may include redundant middle nodes. For example in the embodiment of FIG. 10, the middle nodes $C_{1,2}$ and $C_{2,2}$ may have similar characteristics and cover the same concept because these nodes are both the second node in the initial neural networks NN1 and NN2. In some cases, this may degrade an accuracy of the classification by the new neural network.

In order to avoid redundancy, the training section may perform unsupervised training by introducing a repulsive force between corresponding middle nodes before performing the supervised training of the output layer. In an embodiment, at S190, before performing the supervised training on the output layer, the training section may perform unsupervised training on the middle nodes selected at S158 by biasing the middle nodes such that middle nodes that are similar in relation to connections to the input nodes, are avoided.

The training section may perform the unsupervised training of the middle nodes by at least partially using methods explained in relation to S116. In an embodiment, the training section may perform autoencoding and decoding steps by minimizing cross entropy loss function L as shown in formula (3) but using $\tilde{E}_i$, and a following formula (6)' instead of $E_i$ and the formula (6).

$$\tilde{E}_i = \Sigma_j(w_{i,j} - \alpha \Sigma_{i' \neq i} w_{i',j}) x_j + b_i \quad (6)'$$

where $\alpha$ is a small number, and for example $0.05/O^{0.5}$ (where O is the number of output nodes in the output layer).

In the embodiment, the training section may use stochastic gradient descent to minimize the cross entropy loss function L. For example, the training section may calculate $\partial L/\partial w_{i,j}$, $\partial L/\partial b_i$, $\partial L/\partial c_j$ by using formulae (9)-(11)

$$\frac{\partial L}{\partial w_{i,j}} = \sum_{i'} \frac{\partial L}{\partial \tilde{E}_{i'}} \frac{\partial \tilde{E}_{i'}}{\partial \omega_{i,j}} + \sum_{j'} \frac{\partial L}{\partial E_{j'}} \frac{\partial E_{j'}}{\partial \omega_{i,j}} \quad (9)$$

$$= \sum_{i'} \sum_{j'} \{w_{i',j'}(x_{j'} - \hat{x}_{j'})\} y_{i'}(1 - y_{i'}) \left(\delta_{i,i'} - \alpha \sum_{i'' \neq i'} \delta_{i,i''}\right) x_j + (x_j - \hat{x}_j) y_i$$

$$= \left[\left\{\sum_{j'} w_{i,j'}(x_{j'} - \hat{x}_{j'})\right\} y_i(1 - y_i) - \alpha \sum_{i'' \neq i} \left\{\sum_{j'} w_{i'',j'}(x_{j'} - \hat{x}_{j'})\right\} y_{i''}(1 - y_{i''})\right] x_j + (x_j - \hat{x}_j) y_i$$

$$\frac{\partial L}{\partial b_i} = \sum_{i'} \frac{\partial L}{\partial \tilde{E}_{i'}} \frac{\partial \tilde{E}_{i'}}{\partial b_i} \quad (10)$$

$$= \left[\left\{\sum_{j'} w_{i,j'}(x_{j'} - \hat{x}_{j'})\right\} y_i(1 - y_i) - \alpha \sum_{i'' \neq i} \left\{\sum_{j'} w_{i'',j'}(x_{j'} - \hat{x}_{j'})\right\} y_{i''}(1 - y_{i''})\right]$$

$$\frac{\partial L}{\partial b_i} = \sum_{j'} \frac{\partial L}{\partial E_{j'}} \frac{\partial E_{j'}}{\partial c_j} \quad (11)$$

$$= x_j - \hat{x}_j.$$

At S210, the generating section may determine whether to end the operations. In an embodiment, the generating section may determine whether a predetermined number of iterations of the operations S130-S190 have been completed. In an embodiment, the generating section may determine whether a predetermined number of new neural networks have been generated.

In an embodiment, the generating section may evaluate a performance (e.g., classification accuracy) of the new neural network and determine whether the performance of the new neural network exceeds a threshold.

If the generating section determines not to end the operations, then the generating section may proceed with an operation of S230. If the generating section determines to end the operations, then the generating section may end the operations of FIG. 3.

At S230, the generating section may add the new neural network to the initial neural networks. Then, the generating section may again proceed with an operation of S130.

At an operation of the subsequent S130, the selecting section may select new initial neural networks from among the previous initial neural networks and the new neural network generated at the last S190. In an embodiment, the selecting section may select N' new initial neural networks from among the N initial neural networks and the supervised trained new neural network. Where N' may be an integer equal to or smaller than N.

The apparatus may perform subsequent operations in FIG. 3 using the new initial neural networks. In an embodiment, the generating section may generate a further new neural network including a new middle layer containing one or more middle nodes based on the middle nodes of the middle layers of the new N' initial neural networks at an operation of the subsequent S190.

At each iteration of S130-S190, the apparatus may use different parameters for supervised and/or unsupervised training in order to generate a substantially new neural network. In an embodiment, the training section may use different initial parameters for supervised training of the output nodes at each S154 and/or at each S190.

In an alternative embodiment, the apparatus may not perform the operation of S130. In the embodiment, the apparatus may prepare N initial neural networks in the same manner as the operation of S110, and use these N initial neural networks for operations of S150-S230. For example, the obtaining section may obtain N initial conditions at S114, the training section may perform unsupervised training of the middle layer of each initial neural network using corresponding initial conditions at S116, and the training section may perform supervised training of the output layer of each of N initial neural networks using the set of training data at S118.

In the embodiments above, the neural network includes a single set of middle nodes in a middle layer. In some other embodiments, the apparatus may utilize ensemble learning on the middle layer by including a plurality of sets of middle nodes in the middle layer. In an embodiment, each set of the middle nodes may be trained so as to replicate an input from the input layer.

In these embodiments, the obtaining section may obtain N×A initial conditions at S114 where A is an integer more than 1 (e.g., 10), and the training section may perform unsupervised training on each of A sets of middle nodes of each of N initial neural networks using each of the N×A initial conditions at S116. According to these embodiments, the apparatus may avoid overfitting of the middle layer. The apparatus may calculate an average of outputs from corresponding middle nodes of the plurality of sets of middle nodes and input the average into the output layer.

Figure 11:
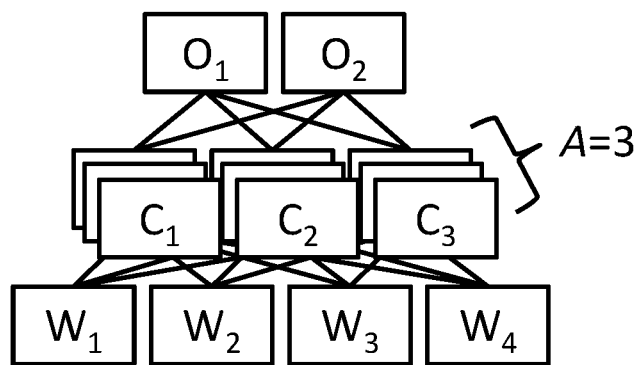
FIG. 11 shows a plurality of sets of middle nodes according to an embodiment of the present invention.

FIG. 11 shows a plurality of sets of middle nodes according to an embodiment of the present invention. In the embodiment of FIG. 11, A is 3 and the middle layer has 3 sets of 3 middle nodes in the neural network.

According to the embodiments explained above, the apparatus may update the middle layer by utilizing the genetic algorithm and thereby generate a new neural network that can classify objects such as texts into accurate categories with less computational resources. In some embodiments, the objects may be not only texts, but also images, audio data, and any other data to be classified.

As explained above, the apparatus may generate a new neural network from the initial neural networks by using at least hybridization of Genetic Algorithm. In an embodiment, the generating section may use other techniques used in Genetic Algorithm. In the embodiment, the generating section may introduce a mutation by randomly changing at least some of the middle nodes or other nodes in the new neural networks.

Figure 12:
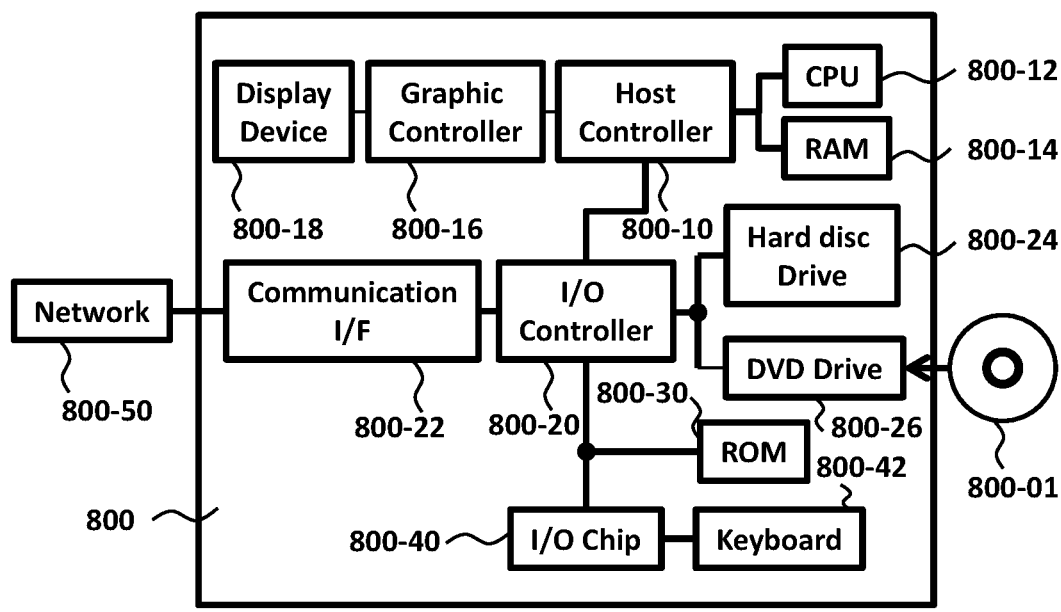
FIG. 12 shows an exemplary hardware configuration of a computer that functions as a system, according to an embodiment of the present invention.

FIG. 12 shows an exemplary hardware configuration of a computer configured for the generation of a neural network containing a middle layer from initial neural networks, according to an embodiment of the present invention.

A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10.

The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable to generate a new neural network containing a middle layer from initial neural networks.

The invention claimed is:

1. A method for generating a neural network, the method comprising:
   preparing a plurality of initial neural networks, each of which comprises an input layer containing one or more input nodes, a middle layer containing one or more middle nodes, and an output layer containing one or more output nodes;
   performing supervised training of the output layer of each of the plurality of initial neural networks using a set of training data to prepare the plurality of initial neural networks; and
   generating a new neural network comprising a new middle layer containing one or more middle nodes based on the middle nodes of the middle layers of the plurality of initial neural networks.

2. The method as recited in claim 1, wherein the plurality of initial neural networks comprises N initial neural networks, N being an integer larger than 1, and wherein the generating of the new neural network comprises:
   selecting one or more of the middle nodes of the N initial neural networks; and
   including the selected one or more middle nodes in the new middle layer of the new neural network.

3. The method as recited in claim 2, wherein the selecting of the one or more of the middle nodes of the N initial neural networks comprises:
   obtaining K different sets of training data, K being an integer more than 1;
   performing supervised training on the N initial neural networks with each of the K different sets of training data to obtain K training results for each of the N initial neural networks; and
   selecting at least one of the middle nodes in the middle layer of the N initial neural networks using the K training results, such that selected middle nodes contribute to an output from the output layer to a greater degree than non-selected middle nodes.

4. The method as recited in claim 2, wherein the middle layer of each of the plurality of initial neural network comprises L middle nodes, L being an integer larger than 2, and wherein the number of the middle nodes in the new middle layer is equal to or less than L.

5. The method as recited in claim 2, wherein the generating of the new neural network further comprises:
   performing unsupervised training on the selected middle nodes, the unsupervised training comprising biasing the middle nodes such that certain middle nodes are avoided.

6. The method as recited in claim 1, wherein the preparing of the plurality of initial neural networks comprises:
   obtaining N initial conditions, N being an integer larger than 1, each condition corresponding to one of the initial neural networks; and
   performing unsupervised training of the middle layer of each initial neural network using the corresponding initial condition.

7. The method as recited in claim 1, wherein the preparing of the plurality of initial neural networks comprises:
   obtaining M initial conditions, M being an integer larger than 2, each condition corresponding to one of M candidate neural networks;
   performing unsupervised training of the middle layer of each candidate neural network using the corresponding initial condition;
   performing supervised training of the output layer of each candidate neural network using a set of training data;
   evaluating a performance of each candidate neural network; and
   selecting N initial neural networks from among the M candidate neural networks using the performances, N being an integer larger than 1 and smaller than M.

* * * * *